April 5, 1966  J. W. BALLARD  3,244,000
CERAMIC DIODE PRESSURE TRANSDUCER AND SYSTEM
Filed Dec. 20, 1960  4 Sheets-Sheet 1
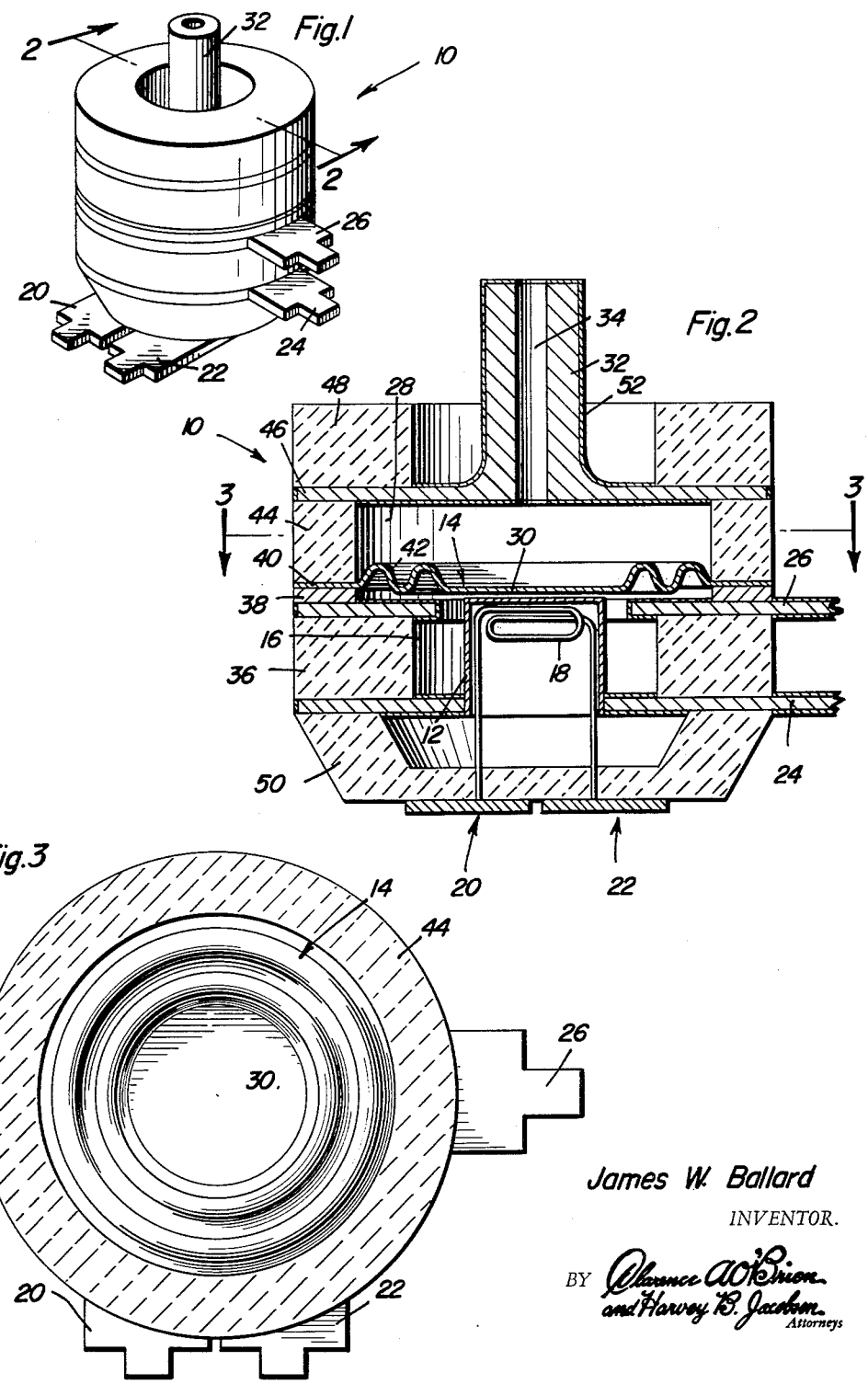
James W. Ballard
INVENTOR.

April 5, 1966  J. W. BALLARD  3,244,000
CERAMIC DIODE PRESSURE TRANSDUCER AND SYSTEM
Filed Dec. 20, 1960  4 Sheets-Sheet 2

James W. Ballard
INVENTOR.

BY Clarence A. O'Brien
and Harvey B. Jacobson
Attorneys

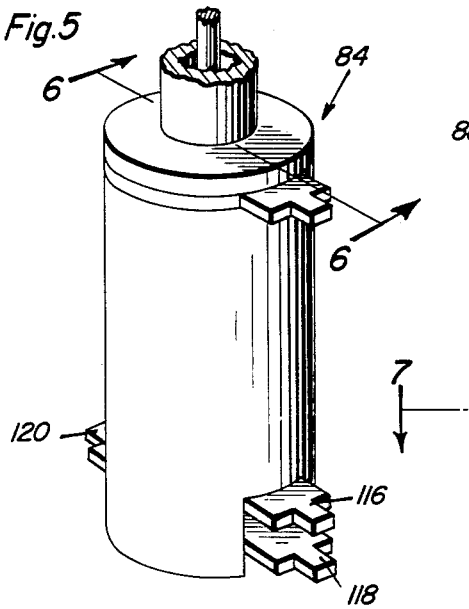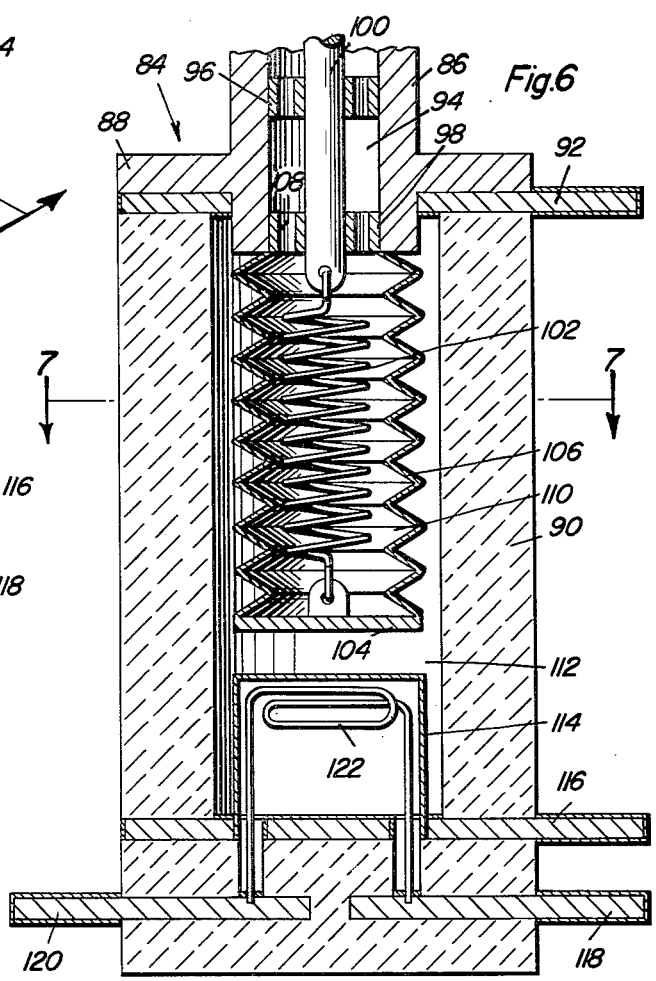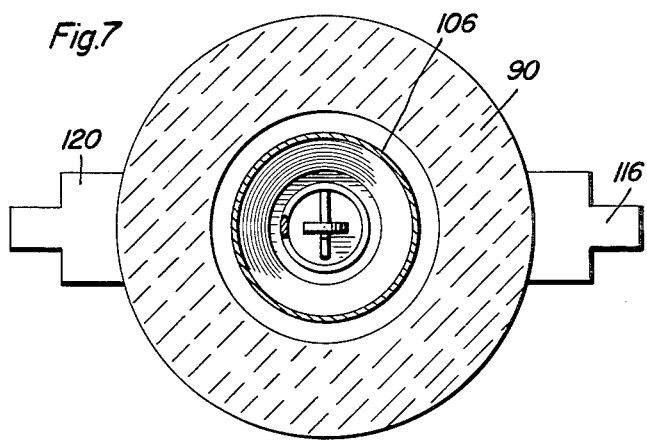

United States Patent Office 3,244,000
Patented Apr. 5, 1966

3,244,000
CERAMIC DIODE PRESSURE TRANSDUCER AND SYSTEM
James W. Ballard, Dayton, Ohio, assignor to Systems Research Laboratories, Inc., Dayton, Ohio, a corporation of Ohio
Filed Dec. 20, 1960, Ser. No. 77,108
4 Claims. (Cl. 73—178)

This invention relates to an electron emitting device and its novel construction by virtue of which unexpectedly sensitive measurements may be made of the medium to which the device is exposed. The device is particularly useful in a pressure transducer system subjected to adverse influences and conditions because it is capable of providing corrected measurements of such influences and conditions.

The present invention is therefore concerned with the measurement of pressure over wide ranges and wherein the measuring device is subjected to the disruptive influences of elevated temperatures, thermal shock and other phenomena such as nuclear radiation, acceleration, pressure variation and shock forces in general.

It is therefore a primary object of this invention to provide a pressure transducer device capable of providing sensitive measurements of such variables as static pressure and air speed within a medium having extreme conditions.

Another object of this invention is to provide an electron emitting device of such novel construction that elevated temperatures and extreme changes in temperatures to which the device is exposed will not adversely influence the current characteristics of the device rendering the electron emitting device particularly useful for pressure measurements wherein current variations between the electrodes of the electron emitting device will be linear and reproducible with respect to the variations in pressure as sensed by the electron emitting device.

An additional object of this invention is to provide a pressure transducer device which by virtue of its novel construction, eliminating the error producing effects of elevated temperatures and rapid temperature changes, is especially useful in a pressure transducer system involving a plurality of diode devices which include static and dynamic pressure sensors for current control whereby differential current measurements between static pressure and dynamic pressure diodes will provide air speed measurements corrected for static pressure variations and wherein static pressure measurements may be made corrected for temperature by measurement of differential current between static pressure sensing diodes and temperature adjusting diodes.

A still further object of this invention is to provide an electron emitting device of the type involving an envelope formed by annular ceramic spacer elements disposed between annular electrode supporting elements to thereby enclose the electron space charge chamber within which the electrodes are disposed. One of the important discoveries with which the present invention is concerned, is the use of ceramic spacer elements made of alumina which is non-conductive and possesses superior shock resisting qualities in combination with columbium metal forming conductive support means for the electrode supporting elements and other metallic elements of the transducer device. The columbium metal besides being conductive and refractory is also unexpectedly more compatible with the alumina ceramic for the purposes of this invention. The columbium may accordingly be brazed to the alumina so as to form with the ceramic a sealed envelope which will not crack or leak with rapid changes in temperature. Furthermore, the thermal coefficient of linear expansion of the columbium and alumina are essentially the same so that temperature changes will not cause relative radial displacement between the electrodes supported by the columbium metal supporting elements and the ceramic alumina spacer elements. Thus strain and concentration of stresses at the joint between the electrodes and the spacer elements is avoided to preserve the exact dimensional relationships involved. The latter compatible qualities of the columbium and alumina are of particular significance in the diode pressure responsive devices of this invention wherein sensitive measurements are to be made of the pressures to which the plate electrode is subjected, causing reduced displacement of a portion thereof so that plate current variation caused by such displacement or variation in spacing between the cathode and plate of the transducer device, may be measured and thereby reflect the instantaneous value of the pressure being sensed. The electron emitting device constructed in accordance with this invention therefore may avoid the use of seals and other bearing devices that have heretofore been used for electron emitting devices subjected to the extreme conditions with which the present invention is concerned. Previous electron emitting devices contrary to the principles of the present invention tolerate the deleterious effects of relative expansion and contraction of different parts with the temperature changes by being provided with means for compensating or counteracting the undesirable effects of such relative displacements. In the present invention however, relative displacements due to temperature changes have been eliminated by a selection of compatible materials as hereinbefore mentioned by virtue of which no sliding parts are involved at all.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of one form of pressure sensing transducer device constructed in accordance with this invention.

FIGURE 2 is a sectional view taken substantially through a plane indicated by section line 2—2 in FIGURE 1.

FIGURE 3 is a sectional view taken through a plane indicated by section line 3—3 in FIGURE 2.

FIGURE 5 is a perspective view of a third form of transducer device.

FIGURE 6 is a sectional view taken through a plane indicated by section line 6—6 in FIGURE 5.

FIGURE 7 is a sectional view taken thorugh a plane indicated by section line 7—7 in FIGURE 6.

Figure 4:
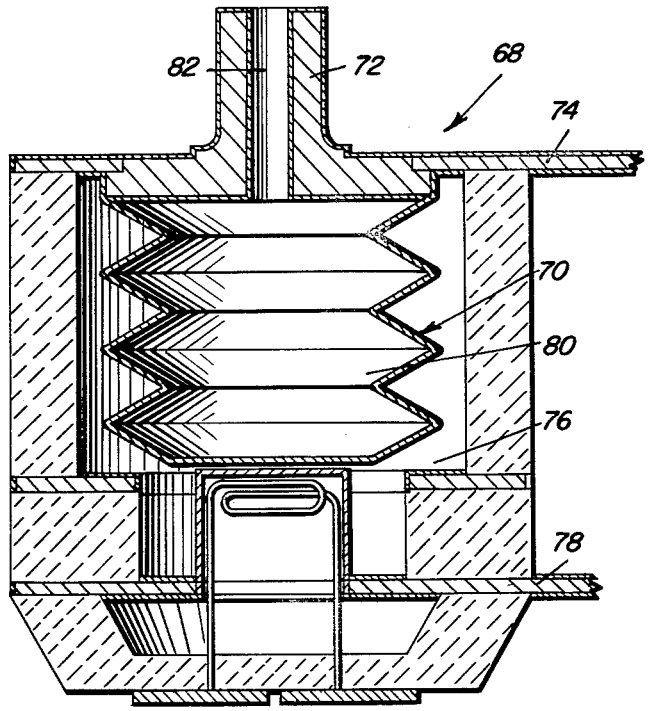
FIGURE 4 is a sectional view of a second form of transducer device made in accordance with this invention.

Referring now to the drawings in detail, FIGURES 1, 2 and 3 illustrate the preferred form of transducer device which is generally indicated by reference numeral 10. It will be observed therefore, that the transducer device 10 is a diode tube device which includes a cathode element 12 and a plate element generally referred to by reference numeral 14 which is in close spaced relationship to the cathode element 12 for accommodating the flow of electrons therebetween within the electron space charge chamber 16 as is well known to those skilled in the art. Accordingly, a heater element 18 is provided and disposed within the cathode element 12 in order to raise the temperature thereof to the requisite value for causing the emission of electrons therefrom. Heater terminals 20 and 22 are therefore provided at the lower external end of the device 10 for connection to the heater-element 18 so as to apply current thereto of the requisite value for bringing the cathode element 12 to the proper temperature. The chamber 16 will also either be evacuated or filled with an inert gas. It will therefore be appreciated that the plate current or the rate at which electrons will flow between the cathode element 12 and the plate element 14 will vary with the spacing between the cathode element 12 and the plate element 14. The relationship between the plate current and the spacing between the cathode and plate is expressed as follows:

$$I_p = \frac{2.33 \times 10^{-6}}{d^2} \times S_p \times E_p^{3/2}$$

where $I_p$ equals plate current, $S_p$ equals the emitting area of the cathode, $d$ equals the cathode to plate spacing and $E_p$ equals the plate potential between the cathode element 12 and the plate element 14. Accordingly, a cathode terminal element 24 is provided and a plate terminal element 26 is provided which terminal elements are respectively connected to the cathode and plate.

It will be observed, that the spacing of the plate element 14 from the cathode 12 is variable by virtue of the mounting thereof as a flexible diaphragm. As will be evident from the tube parameter equation hereinabove set forth, decreasing the spacing between the cathode and the plate will cause an increase in the plate current. The spacing will therefore be decreased by an increase in pressure in chamber 28 which is disposed above the plate element 14 causing the volume of the chamber 28 to increase and thereby displace the tube plate portion 30 of diaphragm 14, closer to the emitting surface on the cathode 12. A pressure tube 32 is therefore provided through which a passage 34 extends in communication with the pressure sensing chamber 28. Accordingly, the upper end of the pressure tube 32 may be exposed to the variable pressure to be measured by the transducer device 12. Measurement of pressure variations may thereby be effected by applying a predetermined plate potential across the cathode and plate terminal elements 24 and 26. The plate current flow between the cathode and plate is then measured. The plate current will therefore be a function of the spacing between the cathode and plate as hereinabove indicated, while the spacing in turn will be a function of the pressure being measured. Accordingly, a calibrated ammeter connected to the device 10 by one of the terminals thereof may measure the plate current and indicate the pressure value which the plate current reflects as will hereafter be explained with greater detail.

One of the important features of the present invention, is the particular stacked assembly construction of the diode tube hereinbefore described. Accordingly, it will be observed that the electrode terminal elements 24 and 26 are axially spaced from each other by an annular spacer element 36, of a non-conductive ceramic material and constitute conductive support means for the plate and cathode. The terminal element 26 is spaced by an annular metallic element 38 from an annular anchoring portion 40 of the plate 14 which is connected to the effective tube plate portion 30 by means of the diaphragm corrugated portion 42. A second annular ceramic spacer element 44 is disposed between the plate 14 and a mounting plate 46 for the pressure tube 32. The tube 32 is also recessed within the upper annular ceramic element 48 while a lower enclosing ceramic element 50 is disposed on the lower side of the cathode terminal element 24 and mounts on the underside thereof the heater terminals 20 and 22. The heater element 18 is mounted within the lower section 50 which when assembled onto the terminal plate 24 will correctly position the heater element 18 within the cathode element 12.

The spacer elements 36 and 44 as well as the upper and lower elements 48 and 50 are made of a refractory ceramic material having non-conductive and shock resistant properties. Pursuant to this invention therefore, the ceramic material deemed most preferable is alumina ($Al_2O_3$). The alumina material may be of any suitable commercial form and not necessarily pure alumina. For example, the alumina material may include as additives $SiO_2$, MgO and CaO. It is believed that as long as the alumina content is within a range of 90-99%, the adhesive qualities of the alumina material within respect to the metallic elements as will hereafter be explained, will be acceptable. It should also be understood, that the ceramic material in addition to its high temperature resisting qualities and shock resisting qualities, wll not be affected by nuclear radiation which is of particular concern where measurements may be taken from space satellite installations.

The metallic elements 24, 26 and 46 of the diode 10, are made of columbium (Cb). It has been discovered, that the columbium metal in addition to being capable of being brazed to the alumina spacer elements also has a thermal coefficient of linear expansion essentially equal to that of the alumina material. Accordingly, by brazing the metallic columbium elements to the alumina ceramic spacer elements, the necessary sealing of the electron space charge chamber 16 and the pressure chamber 28 may be affected without the alumina and columbium cracking because of thermal shock or because of any relative expansion or contraction. The unique compatibility of the alumina and the columbium metal for the construction of the diode tube 10 also eliminates the error-producing effects of temperature on the diode device 10 in a more simple and effective manner than was heretofore thought possible so that the diode device 10 is capable of providing both linear and reproducible variations in plate current with variations in pressure. In using the columbium metal, a protective thin coating of appropriate material will be applied to the exposed surfaces in order to avoid oxidation thereof in air at elevated temperatures. A protective coating 52 of nickel may therefore be applied by a vapor plating process which offers the desired protection at the operating temperatures of the device. From the foregoing, it will be understood that the novel constructional features of the device 10, which is a diode device, may also be applied to vacuum tubes in general including triodes, pentodes, gas type tubes and even microwave tubes or in any device in which it is similarly desirable to braze columbium to alumina. In particular however, the diode tube device 10 of this invention is rendered unexpectedly superior because of the beneficial effects arising from the above stated compatibility between the alumina and columbium. The particular combination of materials and relative locations thereof, not only provide the rugged exterior for the device 10 capable of withstanding the extremes of forces and conditions to which the device will be subjected, but will also enable the device to be used in a system for providing sensitive and corrected measurements of the variable forces and conditions. This is so, because as was hereinbefore indicated very small variations in the spacing between the cathode and plate are relied upon in order to make the pressure measurements in a rarefied atmosphere so that very minor error-producing effects of temperature would adversely affect the measurement values.

Figure 9:
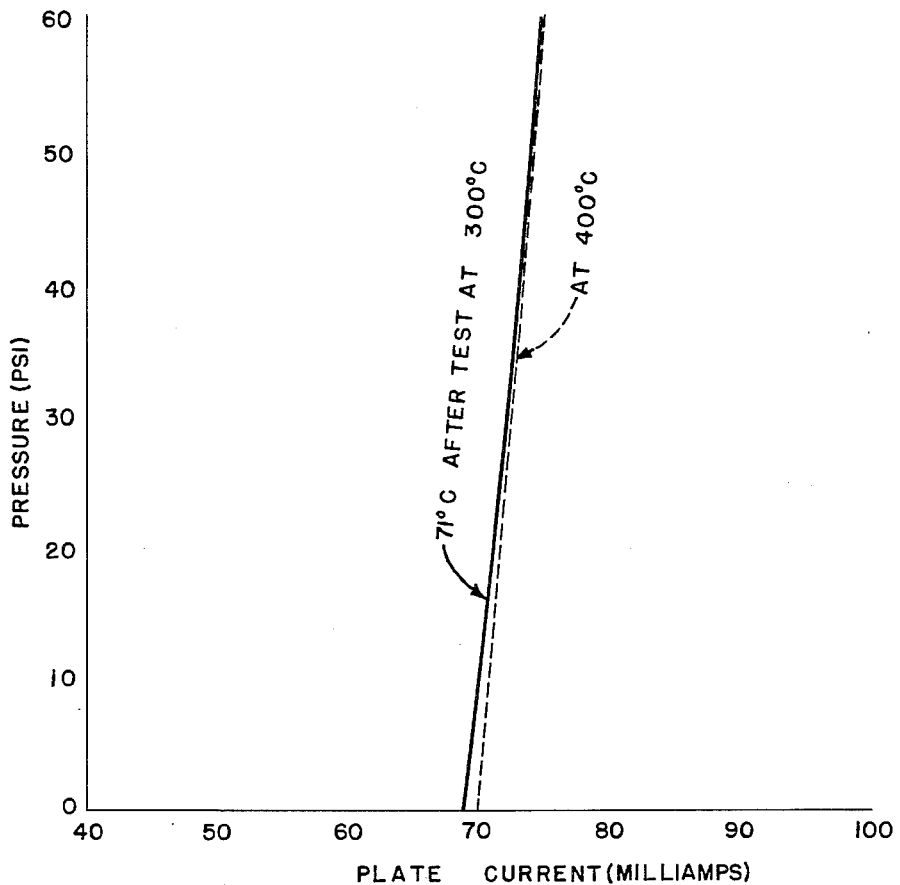
FIGURE 9 is a graphical representation of pressure transducer performance.

The unusual reliable and reproducible pressure measuring attribute of the pressure diode above described and its substantially linear characteristics is graphically demonstrated in FIGURE 9 wherein typical test data of diode performance at a plate potential of 33 v. D.C. is recorded. The relatively small difference between diode performance at 71° C. after a 300° C. test and at 400° C., will be of interest to those skilled in the art.

Figure 8:
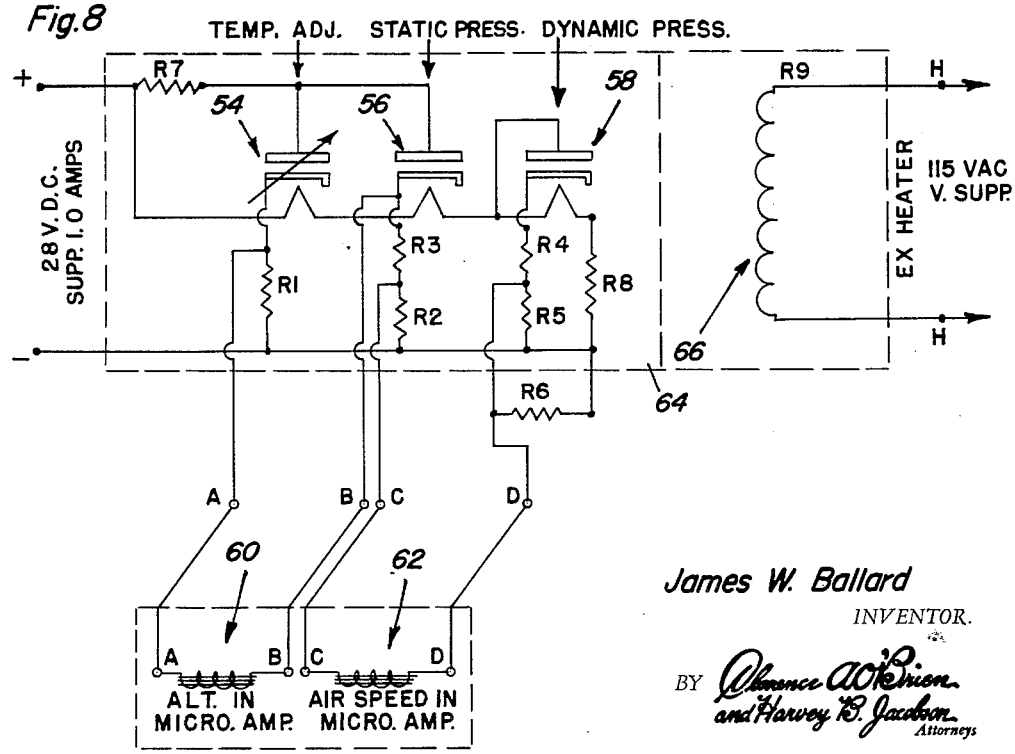
FIGURE 8 is a circuit diagram of a diode pressure transducer system in which the transducer devices of this invention may be used.

Attention is now invited toward FIGURE 8 which illustrates a particular system wherein a plurality of diode tubes such as device 10 as hereinbefore described may be used in a manner taking advantage of its unique facilities resulting from the novel construction thereof. The pressure tube of the device 10 may therefore be so arranged with respect to direction of movement of the vehicle on which it is carried as to provide either a static pressure tap of the atmosphere or a dynamic pressure tap resulting from the movement of the vehicle. The device 10 and the system in which it is used, must therefore be able to measure very minute variations and low values of presusre. It will be appreciated, however, that static pressure for example must be corrected for temperature in order to give an altitude reading while the air speed of the vehicle which would be reflected by the dynamic pressure must be corrected for static pressure in order to give a true air speed value. Accordingly, as illustrated in FIGURE 8 a temperature compensating variable diode device 54 will provide a plate current reflecting the changes in temperature. The static pressure responsive tube 56 responds to static pressure while the dynamic pressure diode 58 responds to dynamic pressure applied thereto. It will therefore be noted that a 28 volt source of D.C. supplying 1.0 amp. is connected across the plate elements of the diodes 54 and 56 and the cathode elements thereof. By virtue of the volt drop across resistance $r1$ one value of plate potential is applied across the cathode and plate of the diode 54 while another plate potential value is applied across the cathode and plate of the diode 56 by virtue of the volt drops across the resistors $r2$ and $r3$ connected between the negative terminal of the volt source and the cathode element. A resistor $r7$ is connected in common between the positive terminal of the voltage source and the plate elements of the diodes 54 and 56. The heater elements for each of the diodes 54, 56 and 58 are supplied from the 28 volt source having only the resistor $r8$ disposed therebetween to apply the requisite voltage and current for heating each of the cathode elements. The plate potential across the plate and cathode of the diode 58 will be of a still different value from the other plate potentials since the plate is connected in series with the filaments of diodes 54 and 56 the positive terminal of the source and the cathode is connected in series with resistors $r4$ and $r5$ to the negative terminal. A pair of differential current measuring ammeters 60 and 62 are therefore provided in order to measure the plate current between the diodes 54 and 56 and between the diodes 56 and 58 respectively. Accordingly, terminal A of the ammeter 60 is connected to the cathode of the diode 54 while the terminal B of the ammeter 60 is connected to the cathode of the diode 56. Since the diode 56 will provide a current which is a function of the static pressure while the diode 54 provides a current which is a function of the temperature the differential current applied to the ammeter 60 will indicate in microamps the altitude or temperature corrected static pressure. The ammeter 62 has a terminal C which is connected to the cathode of diode 56 while the terminal D is connected to the cathode of the diode 58. Accordingly, the differential plate currents of the diodes 56 and 58 will provide the ammeter 62 with a reading in microamps reflecting air speed or dynamic pressure corrected for static pressure.

It will be observed that the diode transducer system as disclosed in FIGURE 8 is encapsulated in ceramic as indicated by dotted lines 64. Accordingly, the entire circuit arrangement is protectively encased and also provides means whereby the temperature thereof may be maintained constant by a heater device 66 supplied with 115 volt A.C. source. The heater device 66 is embedded within the casing 64 and may maintain the system at a constant temperature, for example 500° C. above which temperature the system may be designed to operate.

From the foregoing, it will be understood that the diode devices as constructed in accordance with this invention enable transducer systems such as that described with respect to FIGURE 8 to operate with the desired degree of accuracy in view of the linear and reproducible variations in plate current of the diode devices 54, 56 and 58 with variations in pressure being sensed. The reproducible linear characteristics of the diodes may thereby be utilized to provide corrected readings for the variables quantities being measured. It should therefore be understood that other systems may be devised taking advantage of the heretofore mentioned qualities of the diodes.

Reference is now made to FIGURE 4 wherein a second form of diode 68 is illustrated. In this latter form, the diaphragm type of plate element as described with respect to FIGURES 1–3, is replaced by a bellows type of plate element 70. The pressure tube 72 is therefore connected directly to the bellows 70 and is supported by the metallic plate 74 on which a plate terminal is formed. The electron space charge chamber 76 will therefore be formed between the metallic plate element 74 and the cathode terminal element 78. The chamber 76 will therefore be evacuated or filled with an inert gas. The pressure chamber 80 will therefore be disposed within the bellows 70. The pressure passage 82 within the pressure tube 72 therefore communicates directly with the chamber 80. The ceramic spacer elements and metallic plate elements of the device 68 as illustrated in FIGURE 4 will be made of the materials as hereinbefore described with respect to the diode device 10.

Reference is now made to FIGURES 5, 6 and 7 in which a third form of diode device 84 is illustrated. The device 84 includes an upper enclosing structure 86 which includes a flange portion 88 spaced from the ceramic spacer element 90 by the columbium metal plate supporting terminal element 92. A pressure chamber 94 is formed within the structure 86 between the passage members 96 and 98. The members 96 and 98 accommodate an adjustment plunger element 100 which has connected thereto at the lower end a spring member 102. The lower end of the spring member is connected to a tube plate portion 104 which forms the lower end of bellows mechanism 106. Through passage 108, the pressure within the chamber 94 communicates with the expansible volume chamber 110 within the bellows device 106 so as to displace the plate portion 104 against the bias of spring 102 which may be varied. Accordingly, an adjustable pressure sensing diode device is provided wherein a second control force may be applied to the device through the plunger element 100 as for example for temperature compensation purposes. The plate and cathode spacing may thereby be varied in accordance with temperature changes for use in connection with a temperature compensating transducer such as the diode 54 described in connection with FIGURE 8. In such case the element 100 would constitute a temperature compensating adjustment means. The chamber 112 disposed between the plate portion 104 and the cathode 114 will therefore be evacuated or supplied with an inert gas to form the electron space charge chamber. A cathode terminal element 116 is therefore connected to the cathode element 114 below the ceramic spacer element 90 while a pair of heater elements 118 and 120 are connected to the heater element 122.

From the foregoing description, operation and utility of the diode devices of this invention will be apparent. Although the diode devices were described in connection with pressure sensing purposes, it should be understood that they may also be utilized as sensors for the measurement of temperatures, weight, acceleration, acoustic and seismic disturbances. The sensitivity with which measurements may be made with the instant devices, render them particularly useful for the above enumerated purposes and for other such purposes requiring accurate and sensitive measurements. Also, it will be appreciated, that the novel construction of the diode devices of this invention lends itself particularly useful for the construction of other types of electron emitting devices.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A transducer system comprising a plurality of pressure responsive diode devices having reproducible, linear pressure current characteristics within a temperature operating range of −75° C. to 400° C. including, pressure displaceable plate means and cathode means, static pressure sensing means operatively connected to a first and second of said diode devices, dynamic pressure sensing means operatively connected to a third of said diode devices, means for applying different plate potentials across the cathode means and plate means of the respective diode devices, temperature compensating adjustment means operatively connected to the first of said two static pressure sensing diode devices for varying the plate current characteristics thereof, altitude indicating ammeter means operatively connected to said two diode devices for indicating temperature corrected static pressure by measuring differential plate currents of said two diode devices, air speed indicating ammeter means operatively connected to the second static pressure sensing diode device and the third dynamic pressure sensing diode device for indicating static pressure corrected air speed by measuring differential plate current of said second and third diode devices.

2. An electron emitting, sensing device for sensitive measurement of variable forces and conditions while exposed to extremes of said forces and conditions, comprising spaced electrode means, envelope means including alumina spacer elements, electrode supporting means including columbium metal brazed to the spacer elements for adhesively mounting the electrode means in spaced relation in the envelope means so as to maintain corrective spacing between the electrode means, force and condition responsive means operatively connected to one of the electrode means and operative to effect reduced displacement of an effective portion of one electrode means, and measuring meter means operatively connected to said electrode means for measuring variations in relative spacing between the electrode means.

3. A transducer system comprising, a plurality of pressure responsive devices including relatively displaceable electrode elements, static pressure sensing means operatively connected to two of said devices, dynamic pressure sensing means operatively connected to another one of said devices, means for establishing different potential differences between the electrode elements of the respective devices, temperature compensating means for varying the spacing between the electrode elements of one of said two devices and current measuring means operatively connected to said devices for measuring differential current respectively conducted by each of the devices relative to one of the devices to indicate environmental conditions to which the system is exposed.

4. An electron emitting device comprising at least two electrodes, an envelope enclosing said electrode including a plurality of ceramic spacers and metallic support elements bonded to the ceramic spacers to form a fluid-tight electron space charge chamber, said ceramic spacers being made of a refractory material having substantially the same coefficient of thermal expansion as the support elements, said electrodes being secured to two of said support elements for support thereof in spaced relation to each other within the electron space charge chamber, means connected to another of said support elements for exposing one of the electrodes to environmental conditions, and means connected to said two of the support elements for measuring variations in spacing between said electrodes as a result of changes in the environmental conditions.

References Cited by the Examiner
UNITED STATES PATENTS

| | | | |
|---|---|---|---|
| 1,887,739 | 11/1932 | Mott-Smith | 313—148 |
| 2,025,461 | 12/1935 | Leonard | 313—148 |
| 2,636,385 | 4/1953 | Andres | 73—182 |
| 2,751,786 | 6/1956 | Coulbourn et al. | 73—182 |
| 2,839,701 | 6/1958 | Bourns | 313—146 |
| 2,842,699 | 7/1958 | Germeshausen et al. | 313—220 X |
| 2,844,751 | 7/1958 | Prescott | 313—217 |
| 2,857,663 | 8/1958 | Beggs | 29—473.1 |
| 2,910,607 | 10/1959 | McCullough et al. | 313—250 |
| 2,923,847 | 2/1960 | Childs et al. | 313—250 |
| 2,941,109 | 6/1960 | Senior et al. | 313—250 |
| 2,985,013 | 5/1961 | Yaeger et al. | 73—182 |
| 2,991,197 | 7/1961 | Sandoz | 39—194 X |
| 2,997,583 | 8/1961 | Van Der Ziel | 250—20 |
| 3,050,651 | 8/1962 | Beggs | 313—15 |

GEORGE N. WESTBY, *Primary Examiner.*

ARTHUR GAUSS, *Examiner.*

C. O. GARDNER, V. LAFRANCHI,
*Assistant Examiners.*